US007730170B2

(12) United States Patent (10) Patent No.: US 7,730,170 B2
Richard (45) Date of Patent: Jun. 1, 2010

(54) METHOD AND SYSTEM FOR IDENTIFYING NETWORK CONNECTED DEVICES SUCH AS PERSONAL COMPUTERS

(75) Inventor: Bruno Richard, Crolles (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 1901 days.

(21) Appl. No.: 10/175,135

(22) Filed: Jun. 18, 2002

(65) Prior Publication Data

US 2003/0014518 A1 Jan. 16, 2003

(30) Foreign Application Priority Data

Jun. 18, 2001 (GB) ................. 01410073.9

(51) Int. Cl.
*G06F 15/173* (2006.01)
(52) U.S. Cl. .................................... 709/223
(58) Field of Classification Search ......... 709/220–229, 709/250; 707/1–10
See application file for complete search history.

(56) References Cited

U.S. PATENT DOCUMENTS

| 5,276,789 | A | * | 1/1994 | Besaw et al. ................. 345/440 |
| 5,659,731 | A | * | 8/1997 | Gustafson ........................ 707/4 |
| 5,664,109 | A | * | 9/1997 | Johnson et al. ................. 705/2 |
| 5,841,981 | A | | 11/1998 | Kondo ................... 395/200.53 |
| 5,978,568 | A | * | 11/1999 | Abraham et al. ............. 709/224 |
| 5,983,220 | A | * | 11/1999 | Schmitt ......................... 707/5 |
| 6,011,915 | A | * | 1/2000 | Aaker et al. ................... 703/23 |
| 6,012,056 | A | * | 1/2000 | Menlove ........................ 707/5 |
| 6,049,799 | A | * | 4/2000 | Mangat et al. ............... 707/10 |
| 6,054,987 | A | * | 4/2000 | Richardson ................ 715/734 |
| 6,065,003 | A | * | 5/2000 | Sedluk ........................... 707/3 |
| 6,122,628 | A | * | 9/2000 | Castelli et al. ................. 707/5 |
| 6,338,149 | B1 | * | 1/2002 | Ciccone et al. ............... 714/38 |
| 6,411,997 | B1 | * | 6/2002 | Dawes et al. ................. 709/224 |
| 6,415,281 | B1 | * | 7/2002 | Anderson ....................... 707/3 |
| 6,557,033 | B2 | * | 4/2003 | Maeda ........................ 709/223 |
| 6,564,232 | B1 | * | 5/2003 | Cole et al. .................. 707/203 |
| 6,614,895 | B1 | * | 9/2003 | Impey et al. ........... 379/127.01 |
| 6,686,838 | B1 | * | 2/2004 | Rezvani et al. .............. 340/506 |
| 6,782,395 | B2 | * | 8/2004 | Labelle ..................... 707/104.1 |
| 7,024,476 | B1 | * | 4/2006 | Page et al. .................. 709/224 |
| 7,089,562 | B1 | * | 8/2006 | Kanevsky et al. ........... 719/313 |
| 7,139,790 | B1 | * | 11/2006 | Wang et al. ................. 709/201 |
| 2001/0042118 | A1 | * | 11/2001 | Miyake et al. .............. 709/223 |

(Continued)

OTHER PUBLICATIONS

Muller, Focus on OpenView, CBM Books, 1995, pp. 28-29.*

(Continued)

*Primary Examiner*—Benjamin R Bruckart

(57) ABSTRACT

A method for identifying a device such as a computer in a network includes providing a storage containing a plurality of entries, each entry corresponding to a device connected to the network and comprising a plurality of stored attributes for the device, receiving from the device a set of current attributes associated to the device, for each among a plurality of entries in the storage, generating a similarity metric between current attributes of the received set and respective stored attributes comprised in the entry, the similarity metric taking into account both matches between respective attributes and mismatches between respective attributes. A candidate entry is determined for which the higher similarity metric is obtained. If the similarity metric is higher than a given recognition threshold, identifying the device as the one to which the candidate entry corresponds.

28 Claims, 4 Drawing Sheets

U.S. PATENT DOCUMENTS

| | | | |
|---|---|---|---|
| 2002/0032723 A1* | 3/2002 | Johnson et al. | 709/219 |
| 2002/0052952 A1* | 5/2002 | Yoshida et al. | 709/225 |
| 2002/0062364 A1* | 5/2002 | Watanabe | 709/223 |
| 2002/0073115 A1* | 6/2002 | Davis | 707/500.1 |
| 2002/0116485 A1* | 8/2002 | Black et al. | 709/223 |
| 2002/0178257 A1* | 11/2002 | Cerrato | 709/224 |
| 2003/0120754 A1* | 6/2003 | Muto et al. | 709/220 |

OTHER PUBLICATIONS

Cheng, H.D., et al., "Threshold Selection Based on Fuzzy $c$-Partition Entropy Approach—A Tutorial," *Pattern Recognition*, vol. 31, No. 7, pp. 857-870 (Jul. 1998).

* cited by examiner

METHOD AND SYSTEM FOR IDENTIFYING NETWORK CONNECTED DEVICES SUCH AS PERSONAL COMPUTERS

The present invention generally relates to computer network management tools.

BACKGROUND OF THE INVENTION

In a network including a number of devices such as personal computers (PCs), printers, modems, etc communicating with each other through the network, a network administrator or Information Technology (IT) manager is generally in charge of managing and maintaining the network. For these purposes, the IT manager often uses computer network management tools which allow him to individually keep an inventory and monitor the devices connected to the network. Typically, one task of these tools among others is to keep a database of the PCs, such database being periodically updated by automatic transfer over the network, from each PC to the management tool, of a given set of characteristic attributes of the PC, including machine-related identifiers or parameters and network-related identifiers or parameters as will be described later.

An important factor that the IT Manager needs to take into account is that there are many situations where certain characteristic attributes of a PC may change, although the PC remains the same from the network management standpoint Below are typical examples of events that can cause such changes:

A hard disk has been reformatted;
The Internet Protocol (IP) address of a computer has been dynamically reassigned by a Dynamic Host Control Protocol (DHCP) server after a long period of inactivity (typically several days);
A motherboard has been replaced for service, requiring a new serial number to be assigned to the PC;
A new Basic Input/Output Operating System (BIOS) ROM has been plugged into the PC;
A network node name has changed;
A Local Area Network (LAN) adapter has been changed, which occurs for instance in the case of portable PCs using PCMCIA network cards.

In such cases, at least some known network management tools might fail to correctly identify the network device after such a change. The reason is that such management tools generally consider a given PC through one single characteristic type of data (typically the serial number, IP address or computer name), so the management tool will always conclude that a PC has been replaced if said single characteristic data differs from that which was previously stored. In other words, the known management tools rely on identity between a single element of prior PC data and a freshly received single PC data to determine whether a given device is still connected to the network, or whether a new device has been connected.

For this reason, known network management tools may be subject to corruption when PC characteristic attributes are changed. Such a management tool would therefore maintain a device inventory which does not properly reflect the actual situation in the network. Therefore, the network management tasks are not properly performed and the time lost for manually correcting the inventory may be considerable.

SUMMARY OF THE INVENTION

A main objective of the present invention is to provide a way to improve the accuracy of a device database in a network management tool by more reliably but flexibly making determinations as to whether devices connected to the network have been added or remain the same when characteristic attributes appear to change.

To achieve this, a similarity metric between two sets of received device attributes (including information such as device-related and network-related identifiers or parameters, etc.) is determined, and the value of such a metric is used to automatically determine whether a received set of attributes corresponds to a device which already has an entry in the database, or corresponds to a device freshly added to the network, i.e. for which a new entry should be created in the database.

More particularly, a method for identifying a device such as a computer in a network is provided, comprising the steps of:
a) providing a database containing a plurality of entries, each entry corresponding to a device connected to the network and including a plurality of stored attribute value for said device,
b) receiving from the device a set of current attributes associated to the device,
c) for each among a plurality of entries in said database, establishing a similarity metric between current attributes of the received set and respective stored attributes comprised in said entry, said similarity metric taking into account both matches between respective attributes and mismatches between respective attributes,
d) determining a candidate entry for which the highest similarity metric is obtained,
e) on the basis of the similarity metric, identifying said device as the one to which said candidate entry corresponds.

Preferably said device is only identified as in step e) above, if said higher similarity metric is higher than a given recognition threshold The present invention also provides a system for identifying a device such as a computer in a network, comprising:
a) a database containing a plurality of entries, each entry corresponding to a device connected to the network and comprising a plurality of stored attribute value for said device,
b) means for receiving from the device a set of current attributes associated to the device,
c) a recognition unit comprising a similarity metric generator capable, for each among a plurality of entries in said database, of establishing a similarity metric between current attributes of the received set and respective stored attributes comprised in said entry, said similarity metric taking into account both matches between respective attributes and mismatches between respective attributes, a candidate determinator for determining a candidate entry for which the higher similarity metric is obtained, and a device identifier for identifying said device as the one to which said candidate entry corresponds, for instance when said higher similarity metric is higher than a given recognition threshold.

The present invention also provides a network management equipment comprising such system, and a network of computers, comprising:
a plurality of devices, such as personal computers, to be identified;
a network management facility comprising the above-defined system, and
in each device to be identified, a transmission agent capable of forwarding a set of current attributes of said device to said network management equipment according to a predetermined timing.

BRIEF DESCRIPTION OF THE DRAWINGS

Other aims, features and advantages of the present invention will appear more clearly in the following detailed description, made with reference to the appended drawings in which.

DETAILED DESCRIPTION OF THE PREFERRED EMBODIMENT

A computer network environment generally comprises a number of devices capable of communicating with each other via an appropriate medium. The devices typically are personal computers (PCs), but may also comprise network printers or other types of network-connected peripheral devices Such computer networks are usually inventoried and monitored by a is network administrator.

Figure 1:
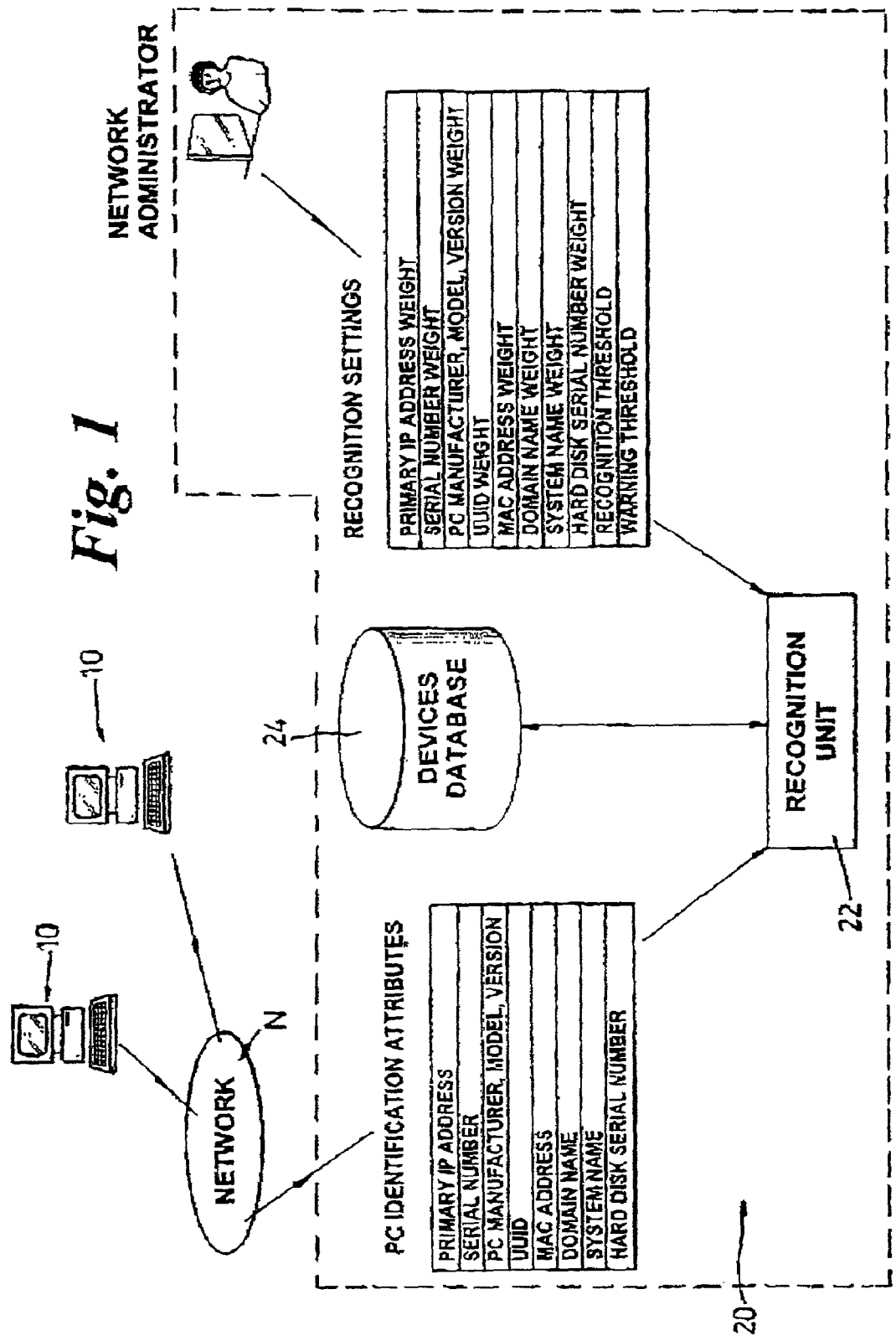
FIG. 1 is a block diagram showing a preferred embodiment of the present invention.

In FIG. 1, a network-connected PC is designated by the numeral 10, while reference number 20 designates a network administrator, generally comprising a dedicated PC with network administration and management software tools. The network is designated by N.

The overall system further includes a recognition unit 22 which preferably runs on the network administration PC 20 and which cooperates with a device database 24 which is also stored in the administration PC 20.

It will be apparent however that the recognition unit 22 and associated database 24 can be stored and operated in a device different from the administration PC 20, and even remotely from the network as will be described later.

Each PC includes a software agent which communicates with the recognition unit 22 via network N as further described below.

The network administration PC 20 further includes an administrator adjustment software unit, such as a software agent having a suitable user interface, which also communicates with the recognition unit 22 as further described below.

The detailed operation of the method and system according to the present invention will now be described with reference to FIGS. 1 and 2.

Figure 2:
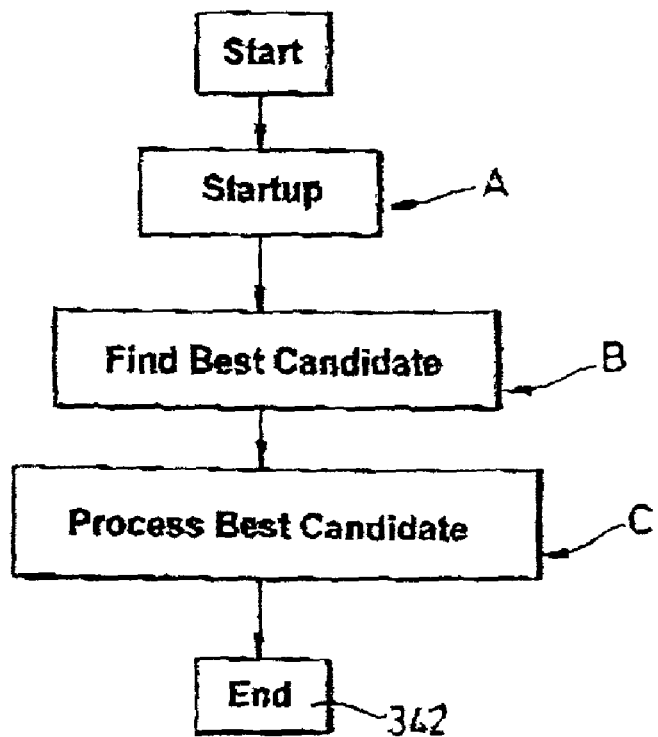
FIG. 2 is a main flow chart showing the steps performed in such a preferred embodiment.
Figure 3A:
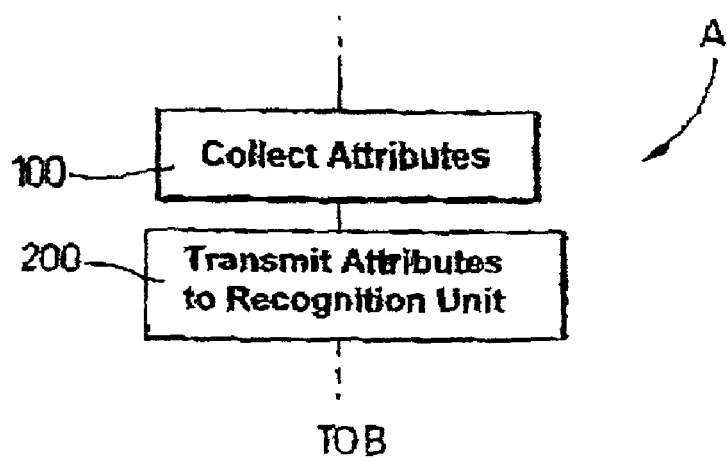
FIG. 3A to 3C illustrate detail included in the main flow chart of FIG. 2.
Figure 3B:
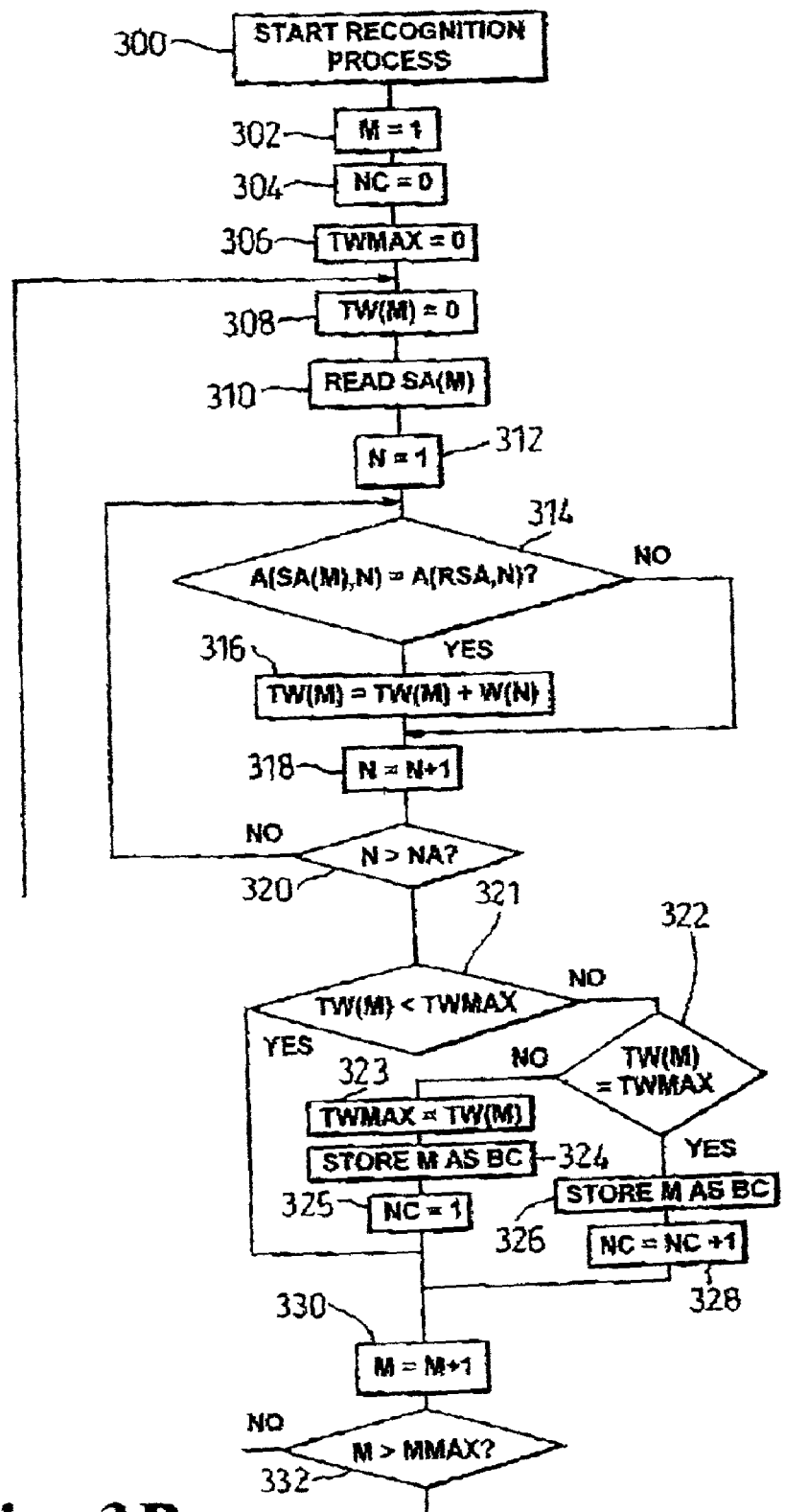
Figure 3C:
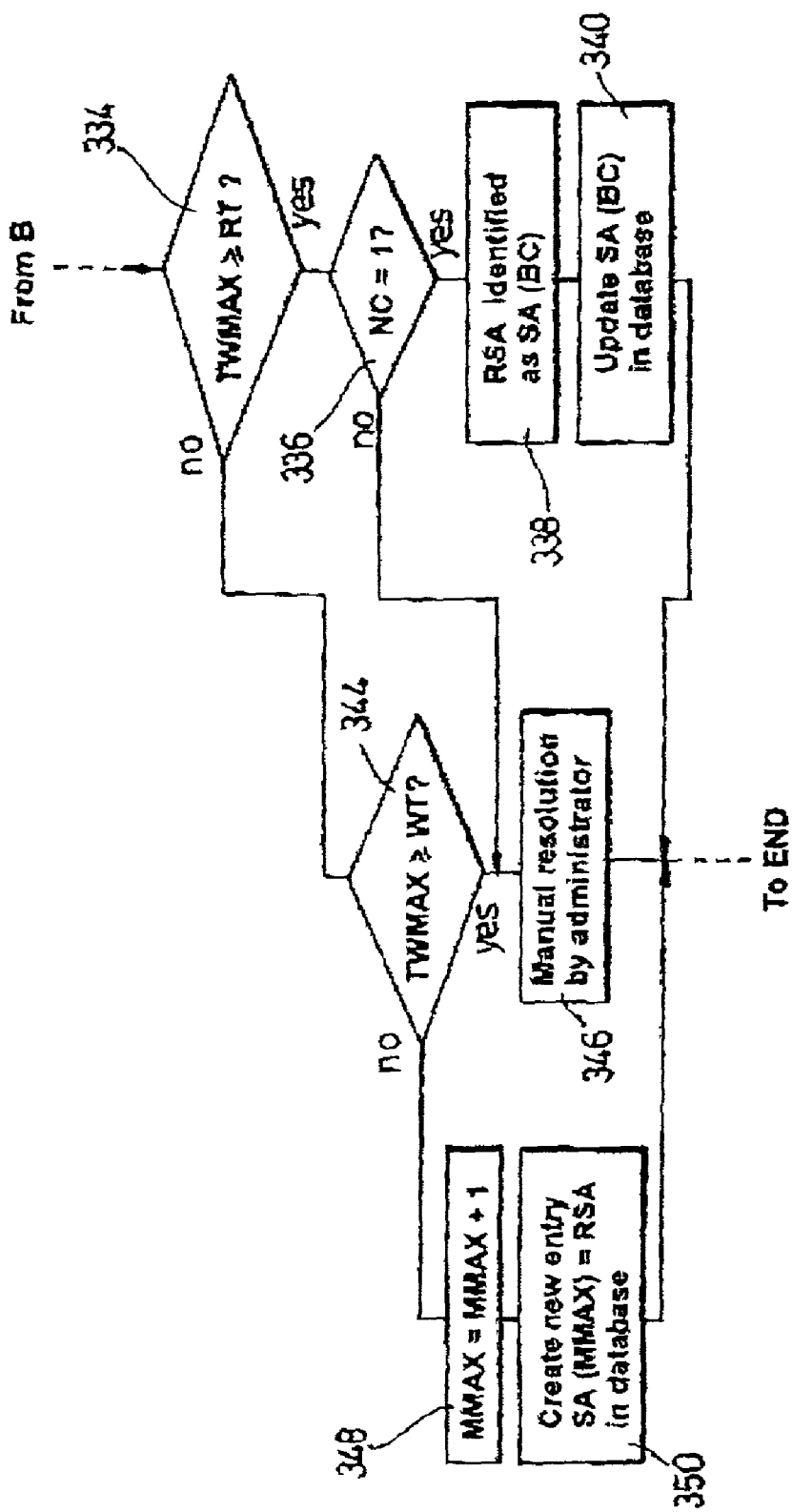

The software agent in each PC comprises instructions for fetching a number of PC current attributes stored in the PC 10, and instructions for transmitting the collection of current attributes to the recognition unit 22 through the network N (step 100 in FIG. 2).

In the present embodiment, the software agent of PC 10 collects a number of predetermined attributes by the following steps:
the primary IP (Internet Protocol) address is read from the network parameters;
a determination is made as to whether a SMBIOS (System Management BIOS extensions) file is present in the ROM of the PC, and in the affirmatve, a number of other attributes are determined from the contents thereof, and in the present example:
the serial number of the PC;
a field including the PC manufacturer, the PC model and the PC version;
the Universally Unique identifier (UUID) of the PC;
the Media Access Control (MAC) address of the primary Local Area Network (LAN) adapter is read from the network parameters;
if the PC belongs to an NT domain, the PC domain node name is read from the PC network parameters;
the system name of the PC is obtained from its operating system;
finally, the Serial Number of a primary hard disk of the PC is read from the primary hard disk drive.

For given attributes, the software agent in the PC may advantageously be designed so as to perform predetermined attribute validity tests in order to check whether these attributes are valid.

For instance, if the PC serial number which has been read begins with "12345", this means that it does not designate a significant serial number, so that the software agent ignores the value.

Another test may be performed on the MAC address in order to determine whether it designates a PC or a different device (for instance, the MAC address "444553540000" designates a modem, so that it should not be taken into account in the present example).

At the end of this attribute collection process, the software agent 12 has collected and stored in appropriate memory fields the following PC identification attributes (with some fields being potentially empty when the collected value is ignored):
Primary IP address
Serial number
PC Manufacturer, PC Model, PC Version
UUID
MAC address
Domain name
System name
Hard Disk Serial Number.

At a step 200 in FIG. 2, the software agent 12 sends the collected set of attributes to the recognition unit 22 through the network N, as also shown in FIG. 1.

It should be noted here that, in an initialization stage of the network setup, each PC in the network has individually provided the administration PC 20 with the above set of attributes and for each PC, the administrator has created in database 24 a corresponding entry under which said set of attributes has been stored.

It should also be noted in this regard that the word "database" should not be understood in a restrictive way, as the attributes for each the PC could alternatively be stored in a two-dimensional table, with e.g. one line per attribute and one column per PC, or in any other suitable memory organization.

After such initialization, each PC 10 provides to the network administrator 20, according to a given timing, its current set of attributes, some of which might have individually changed value during the lifetime of the PC.

The basic purpose of the recognition unit 22 is to determine, based on the database contents and on the received set of current attributes, whether the PC from which this set of attributes is received already has an entry in the database, or whether this is a PC which has been newly connected to the network In FIG. 2, step 100 designates the process of collecting the set of attributes of a given PC, while in step 200, this set of attributes is transmitted to the recognition unit 22.

Step 300 is the starting point of a main recognition process performed by the recognition unit 22. This process is based on the determination, for any set of attributes received from a PC, of the degree of similarity (hereinafter similarity metric)

between such set of attributes and the sets of attributes contained in all existing entries of the database, respectively.

This process uses a table of recognition settings as shown in FIG. 1, including attribute weights and similarity thresholds. An example of the contents of such parameter table is as follows:
- Primary IP address weight
- Serial Number weight
- PC manufacturer, Model, Version weight
- UUID weight
- MAC address weight
- Domain name weight
- System name weight
- Hard Disk Serial Number weight
- Recognition threshold
- Warning threshold.

Preferably, all the values of these parameters have been adjusted at the administrator level at the initialization stage of network setup, through a suitable software agent with user interface.

The weights are designated by W(1) to W(NA), where NA designates the number of attributes (NA=8 in the present species), while the recognition threshold and the warning threshold are designated by RT and WT, respectively.

Additionally, in the flowchart of FIG. 2, the following reference signs are used:

RSA designates the received set of attributes,

M designates the current entry of the database, with which a similarity metric is determined, MMAX designates the total number of entries in database 24, NC designates a current number of candidates, i.e. entries in the database which will have shown the same highest similarity metric with the received set of attributes, TW(M) designates a total weight computed from the received set of attributes and the attributes stores at entry M in the database, and constitutes the similarity metric, TWMAX designates the current highest total weight, i.e. highest similarity metric during the recognition process, SA(M) designates the set of attributes of entry M, N designates a current attribute number of a set of attributes during the recognition process, A(SA(M), N) designates the Nth attribute of the set of attributes SA(M), A(RSA, N) designates the Nth attribute of the received set of attributes RSA.

The recognition process shown in the flowchart of FIG. 2 will now be described in detail.

In step 302, the value of M is set to 1, i.e. the entry No. 1 of database 24 is taken into consideration for the recognition process.

In step 304, the current number of candidates NC is initialized to 0 (no candidate yet).

In step 306, the value of the maximum total weight TWMAX is initialized to zero.

In step 308, the total weight TW(M) for entry M is initialized to 0.

The set of attributes SA(M) corresponding to entry M (M=1 for the time being) is read from the database in step 310.

In step 312, N is initialized to 1, which corresponds to the first attribute.

In Step 314, a comparison is made as to whether the Nth attribute value of the Mth set of attributes SA(M) is equal to the Nth attribute value of the received set of attributes.

If both attribute values are equal, then in step 316 the total weight TW(M) is increased by the weight value W(N) allocated to the Nth attribute; then N is incremented by one in step 318 so as to move to the next attribute. On the contrary, if both attribute values compared in step 314 are different, then the total weight TW(M) is left unchanged, and the program goes directly to step 318.

In step 320, a determination is made whether the total number of attributes NA has been exceeded. In the negative, this means that other attributes need to be compared and the program goes back to step 314 for the next attribute.

Once the number of attributes is exceeded, the program exits this loop, and it is understood that the total weight TW(M) then represents a weighted sum of attribute equality, i.e. the sum of all attribute weights W(N) for which the Nth attribute received from the PC was found identical to the Nth attribute of the currently examined set of attributes SA(M) in the database.

In that case, the next step 321 determines whether the total weight TW(M) is lower than a current maximum total weight value TWMAX (initially set at 0).

A response "yes" to this test reveals that for a previous total weight computation related to a previous database entry, a higher total weight had been obtained. This means that the database entry currently considered by the recognition process has lower similarity with the received set of attributes than a previously considered database entry, so that the current entry is rejected as candidate.

In such case, the program increments the value of M in step 330 and then a determination is made in step 332 as to whether all database entries 1 to MMAX have already been processed. In the negative, the program goes back to step 306 the in order to repeat the above process with the next database entry, after the value of TW(M) has been reset to 0.

Turning back to step 321, if the comparison shows that the total weight TW(M) just computed is not lower than the current TWMAX value, then the program goes to step 322 where it is determined whether TW(M) equals TWMAX. In case of a negative answer, this means that TW(M) is strictly higher than TWMAX, which itself means that, for the current database entry, a higher similarity metric has been obtained than with any previous database entry. In such case, TWMAX takes as a new value the current value of TW(M) in step 323, and then entry M is stored as current "best candidate (BC) for the similarity purposes in step 324. Thereafter, the variable NC (number of candidates) is set to one, as It is ascertained at that stage that there is only one database entry which generates a total weight TW(M) equal to TWMAX.

Returning to step 322, if this test shows that the just computed value of TW(M) is equal to TWMAX, this means that the currently considered database entry M generates the same similarity metric as a previously considered database entry. In such case, M is also stored as a best candidate in step 326 (together with a previously stored candidate), while the number of candidates is increased by one to reveal that an additional candidate with identical similarity metric has been found.

After step 325 or step 328, the program goes to step 330 for increasing M so as to consider the next candidate as described in the foregoing.

Turning back now to step 332, when this test reveals that all entries in the database have been considered (answer "yes"), then the program goes to step 334 where a determination is made whether the previously computed value of TWMAX, which is the highest total weight, i.e. highest similarity metric, obtained with all database entries, is equal or higher than the recognition threshold RT set in the recognition settings. If yes, this means that entry(ies) BC stored in step 324 or 326 complies with the similarity requirement of the recognition process. In such case, a determination is is made as to whether the number of candidates NC is equal to 1. With an affirmative answer, this means that there is only one entry as best candidate. In that case, the received set of attributes is identified as those belonging to the best candidate BC in step 338, and then in step 340, the set of attributes of BC, i.e. SA(BC), is updated with the values of the received set of attributes RSA in database 24.

Turning back to step 336, if this test shows that NC is greater than 1, which means that there are at least two "best candidates" which have given rise to the same TWMAX value, then the program goes to a step 346 of manual resolution by Administrator, in which the network Administrator will be prompted with this result so that, among the two or more best candidates, he can manually select the best one by analyzing in detail the values of the attributes of the candidates comparatively with the attribute values in the received set of attributes RSA.

Turning back now to step 334, if this test reveals that the maximum total weight TWMAX is lower than the recognition threshold RT, this means that no best candidate generated a similarity metric sufficiently high for being automatically declared as corresponding to the received set of attributes. In such case, a test is performed in step 344 to determine whether TWMAX is greater or equal to the warning threshold set WT adjusted in the recognition settings. If the answer to this test is "no", this means that the similarity metric between the received set of attributes and any database entry is not sufficient for concluding in any case that the received set of attributes corresponds to an existing database entry. In such case, a new entry is created in the database with a set of attributes having values each equal to those of the received set of attributes, which is reflected in step 348 where the number of database entries MMAX is increased by one and in step 350 where the new entry SA(MMAX) is created.

Turning back to step 344, if this test shows that TWMAX is greater or equal to the warning threshold WT, then this reveals that there might be a chance that the received set of attributes, despite a rather low similarity metric with one or several database entries, still corresponds to one of these entries but requires manual checking. In that case, the program goes to step 346 of manual resolution by administrator.

All three steps 340, 346 and 350, after being performed, go to step "end" 342, in which the recognition unit is ready to receive the next set of attributes and to start again at step 100.

From the above description, it will be understood that if one entry of the database has been found which has attributes which are all equal to the respective attributes of the received set RSA, then the computed total weight will be equal to the sum of all attributes, i.e.:

$$TWMAX=TW(M)=W(1)+W(2)+\ldots+W(NA)$$

In such case, the entry M is identified as the one corresponding to the received set of attributes in a quite straightforward manner, as this value of TWMAX will clearly be higher than recognition threshold RT and will correspond to a unique entry M.

If one or several attributes have changed for a given PC then the recognition process will either:
  recognize the PC and consolidate it in the database (steps 338 and 340);
  fail to recognize the PC, and thus create a new database entry (steps 348 and 350);
  partially recognize the PC and then warn the network administrator for manual resolution (step 346). A typical case will be when two or more identification attributes of a PC have changed, in which case the recognition process may not automatically recognize the PC, but network administrator can deal with the case in a safer way.

This latter situation can occur e.g. if a PC hard disk is reformatted at the same time the LAN adapter for the same PC is changed. Of course, the manual resolution in step 346 should be designed to take into account a plurality of candidate entries; for that purpose, the user interface for manual resolution will display the stored attributes for all the candidates which have generated a total weight value above the warning threshold but lower than the recognition threshold.

The individual attribute weights, as well as the recognition threshold and warning threshold, can be adjusted by the network administrator or IT manager. This offers a number of advantages.

For instance, an IT manager may consider that the UUID is primary for PC recognition, so that he will set a high weight for the UUID attribute.

In an other example, an IT manager may want to see most attribute changes in the PCs connected to the network. In such case, he will set high recognition and warning thresholds and/or select high weights PCs said most attributes.

A further variation might entail determining a group of PCs which satisfy a particular threshold criteria. Such a result may be useful in determining candidate groups.

An IT manager may also consider that the change of value for a given attribute is completely irrelevant In such case, he will set a value of 0 for the weight of this particular attribute.

A practical example will now be described:
1) the recognition settings have been adjusted by the IT manager as follows:

| Setting | Weight |
| --- | --- |
| Primary IP address weight | 5 |
| Serial Number, weight | 5 |
| PC Manufacturer, Model, Version weight | 5 |
| UUID weight | 20 |
| MAC address weight | 0 |
| Domain name weight | 3 |
| System name weight | 0 |
| Hard Disk Serial Number weight | 10 |
| Recognition threshold | 30 |
| Warning threshold | 10 |

2) the database 24 contains the following entries:

| Attribute | Entry1 | Entry2 | Entry3 |
| --- | --- | --- | --- |
| Primary IP address | 15.128.135.1 | 15.128.135.2 | 15.128.135.3 |
| Serial Number | 1111AA11 | 2222BB22 | 3333CC33 |
| PC Manufacturer, Version | Basic PC | Basic PC | Basic PC |
| UUID | 11111111 | 22222222 | 33333333 |
| MAC address | OABCDEF12345 | OABCDEF12345 | <None> |
| Domain name | Computer1 | Computer1 | Computer3 |
| System name | Computer1 | Computer1 | Computer3 |
| Hark Disk Serial Number | 1234 | 5678 | 90AB |

3) first case: a received set of PC attributes contains the following values:

| Attribute | Value | Comments |
| --- | --- | --- |
| Primary IP address | 15.128.135.4 | No corresponding database entry |
| Serial Number | 1111AA11 | Same as Entry1 in database |
| PC Manufacturer,. | Basic PC | Same as all database entries |

-continued

| Attribute | Value | Comments |
|---|---|---|
| UUID | 11111111 | Same as Entry1 in database |
| MAC address | 0ABCDEF12345 | Same as Entry1 in database |
| Domain name | Computer 4 | No corresponding database entry |
| System name | Computer 4 | No corresponding database entry |
| Hard Disk Serial Number | 1234 | Same as Entry1 in database |

The recognition process computes the similarity metrics, i.e. total weights TW(Entry1), TW(Entry2) and TW(Entry3), respectively, as follows:
TW(Entry1)=5+5+20+10=40
TW(Entry2)=5
TW(Entry3)=5
The highest similarity metric TWMAX is thus 40 and corresponds to database Entry1.

As 40 is higher than the recognition threshold set to 30, the recognition has safely determined that the PC under recognition is the same as the one previously designated under database Entry1.

The attributes under Entry1 are preferably updated with the current values, so that the database evolves with the PCs in the network.

4) second case: a received set of PC attributes contains the following values:

| Attribute | Value | Comments |
|---|---|---|
| Primary IP address | 15.128.135.4 | No corresponding database entry |
| Serial Number | 1111AA22 | No corresponding database entry |
| PC Manfacturer | Basic PC | Same as all entries in database |
| UUID | 44444444 | No corresponding database entry |
| MAC address | 0ABCDEF12345 | Seine as Entry1 in database |
| Domain name | Computer 4 | No corresponding database entry |
| System name | Computer 4 | No corresponding database entry |
| Hard Disk Serial Number | 4321 | No corresponding database entry |

The recognition process computes the similarity metrics as follows for database entries Entry 1, Entry2 and Entry3:
TW(Entry1)=5
TW(Entry2)=5
TW(Entry3)=5
The highest similarity metric TWMAX thus equals 5.

As 5 is lower than the warning threshold set to 10, the recognition process can safely determine that the PC under recognition was not already present in the database.

The received set of attributes is then stored as a new entry Entry4 in the database.

The recognition method and system as described in the foregoing can advantageously be incorporated, into broader management tools which are operable e.g. in a dedicated network management PC connected to a PC network environment, and can be readily installed as an upgrade to pre-existing tools. In such cases, an appropriate software agent for automatically and transparently forwarding attributes sets to the network management PC is preferably provided in the standard operating system of each PC, so that in particular a new PC freshly connected to the network may be detected by the recognition unit as a new device, and generate a new database entry, without any manual input.

The recognition method and process can also be operated remotely for those environments having no dedicated network management tools. For instance, a network management service provider may operate the recognition unit as a remote subscriber service through the Internet or the like, wherein each PC transmits at predetermined time intervals its current set of attributes to a remote server through a specifically designed protocol.

In such case, the work of recognizing PCs and housekeeping of the database may be invoiced e.g. based on the current number of entries in the database.

Although the invention has been described by way of example and with reference to particular embodiments it is to be understood that modification and/or improvements may be made without departing from the scope of the appended claims.

Where in the foregoing description reference has been made to integers or elements having known equivalents, then such equivalents are herein incorporated as if individually set forth.

The invention claimed is:
1. A method for identifying devices in a network, comprising the steps of:
receiving a plurality of sets of attributes from a corresponding plurality of devices connectable to the network during an initialization stage;
creating a database containing a plurality of entries, each entry corresponding to one of the devices connected to the network and comprising the set of attributes for said device;
receiving from a first one of the devices connected to the network a current set of attributes associated with the first device during a recognition process;
for each of at least a portion of the plurality of entries in said database, generating a similarity metric, wherein generating the similarity metric includes:
selecting a current entry from the plurality of entries in the database,
comparing each of the attributes of the received set of attributes and respective attributes of the current entry, and
generating the similarity metric in response to the comparisons;
said similarity metric taking into account both matches between respective attributes and mismatches between respective attributes;
determining a candidate entry of the plurality of entries in the database for which the higher similarity metric is obtained; and
on the basis of the similarity metric, identifying said first device as the one to which said candidate entry corresponds:
wherein the sets of attributes each include:
Primary IP address,
Serial number,
PC Manufacturer, PC Model, PC Version,
UUID,
MAC address,
Domain name,
System name, and
Hard Disk Serial Number;
if said higher similarity metric is lower than said recognition threshold, then creating in said database a new entry for said first device, with stored attributes equal to said current attributes; and
if one of the attributes fulfills a given condition of insignificance, then that attribute is excluded from the comparison, wherein the attributes include the device serial number, and if the serial number is determined to he an insignificant serial number the serial number attribute is excluded from the comparison.

2. A method as claimed in claim 1 wherein said first device is identified if said higher similarity metric is higher than a given recognition threshold.

3. A method according to claim 2, wherein said recognition threshold is adjustable.

4. A method according to claim 2, further comprising:
if said higher similarity metric is lower than said recognition threshold, then determining whether said higher similarity metric is higher than a warning threshold,
if said higher similarity metric is higher than said warning threshold, then displaying said current attributes and the stored attributes of said candidate entry for human recognition.

5. A method according to claim 4, wherein said warning threshold is adjustable.

6. A method according to claim 1 wherein a group of candidate entries are determined based on a plurality of similarity metrics.

7. A method according to claim 1, wherein a plurality of sets of attributes are received from a plurality of devices connected to said network, so as to individually identify said plurality of devices.

8. A method according to claim 1, wherein a similarity index is generated for each of the plurality of entries in said database.

9. A method according to claim 1, wherein an attribute weight is allocated to each attribute, and said similarity metric comprises a sum of the attribute weights corresponding to attributes for which an attribute value of the received set of attributes equals a corresponding attribute value of the current entry.

10. A method according to claim 9, wherein for at least one attribute weight, the attribute weight equals zero.

11. A method according to claim 9, wherein said attribute weights are adjustable.

12. A method according to claim 1, wherein said attributes are selected from a group comprising system attributes, peripheral device attributes, in particular mass storage attributes, and network parameter attributes.

13. A system for identifying devices in a network, comprising:
a memory storing a database containing a plurality of entries, each entry corresponding to a device connected to the network and comprising a set of stored attributes for said device received from the corresponding device during an initialization phase; and
a processor configured to receive a set of current attributes associated with a first one of the devices connected to the network, and to generate, for each of at least a portion of the plurality of entries in said database, a similarity metric, wherein generating the similarity metric includes:
selecting a current entry from the plurality of entries in the database,
comparing each of the attributes of the received set of attributes and respective attributes of the current entry, and
generating the similarity metric in response to the comparisons;
said similarity metric taking into account both matches between respective attributes and mismatches between respective attributes, to determine a candidate entry of the plurality of entries in the database for which the higher similarity metric is obtained, and to identify said first device as the one to which said candidate entry corresponds
wherein the sets of attributes each include:
Primary IP address,
Serial number,
PC Manufacturer, PC Model, PC Version,
MAC address,
Domain name,
System name, and
Hard Disk Serial Number;
if said higher similarity metric is lower than said recognition threshold, then creating in said database a new entry for said first device, with stored attributes equal to said current attributes; and
wherein each device is further configured to disregard a current attribute for similarity metrics determination if said current attribute fulfills a given condition of insignificance, wherein the attributes include the device serial number, and if the serial number is determined to be an insignificant serial number the serial number attribute is excluded from the comparison.

14. A system as claimed in claim 13 wherein said processor identifies said first device as the one to which said candidate entry corresponds when said higher similarity metric is higher than a given recognition threshold.

15. A system according to claim 14, further comprising a user interface for adjusting said recognition threshold.

16. A system according to claim 14, wherein said processor is further configured to create in said database a new entry for said first device, with stored attributes equal to said current attributes, when said higher similarity metric is lower than said recognition threshold.

17. A system according to claim 14, wherein said processor is further configured to, when said higher similarity metric is lower than said recognition threshold, determine whether said higher similarity metric is higher than a warning threshold, and further comprising:
a user interface for displaying said current attributes and the stored attributes of said candidate entry for human recognition when said higher similarity metric is higher than said warning threshold.

18. A system according to claim 17, wherein said user interface is capable of displaying stored attributes for a plurality of candidate entries.

19. A system according to claim 17, wherein said processor is further configured to create in said database a new entry for said first device when said higher similarity metric is lower than said warning threshold.

20. A system according to claim 17, further comprising a user interface for adjusting said warning threshold.

21. A system according to claim 13, wherein said processor is further configured to be operable in sequence for a plurality of sets of current attributes received from a plurality of devices connected to the network so as to individually identify said plurality of devices.

22. A system according to claim 13 wherein said processor generates a similarity metric between said received set of current attributes and each of the plurality of entries in said database.

23. A system according to claim 13, wherein an attribute weight is allocated to each attribute, and said similarity metric comprises a sum of the attribute weights corresponding to attributes for which an attribute value of the received set of attributes equals a corresponding attribute value of the current entry.

24. A system according to claim 23, wherein for at least one attribute weight, the attribute weight equals zero.

25. A system according to claim 23, further comprising a user interface for adjusting said attribute weights.

26. The system according to claim 13, wherein:
the memory and the processor are associated with a network administration computer.

27. The system of claim 26, wherein the network administration computer is associated with a network management facility.

28. A network of computers, comprising:
a network management facility comprising a system according to claim 13 and
a plurality of devices to be identified, wherein each device is configured to transmit a set of current attributes of said device to said network management facility according to a predetermined timing.

* * * * *